(12) United States Patent
Hilmer et al.

(10) Patent No.: US 7,771,829 B2
(45) Date of Patent: Aug. 10, 2010

(54) COMPOSITE ELEMENT, ESPECIALLY A WINDOW PANE

(75) Inventors: Klaus Hilmer, Brockum (DE); Joachim Schuessler, Birkenfeld (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 131 days.

(21) Appl. No.: 11/912,775

(22) PCT Filed: Apr. 27, 2006

(86) PCT No.: PCT/EP2006/061886

§ 371 (c)(1),
(2), (4) Date: Oct. 26, 2007

(87) PCT Pub. No.: WO2006/117325

PCT Pub. Date: Nov. 9, 2006

(65) Prior Publication Data

US 2008/0187765 A1 Aug. 7, 2008

(30) Foreign Application Priority Data

Apr. 29, 2005 (DE) ............... 10 2005 020 510

(51) Int. Cl.
*B32B 17/10* (2006.01)
*B32B 37/06* (2006.01)
*B29C 45/00* (2006.01)

(52) U.S. Cl. .................. 428/425.6; 156/242; 156/272.6

(58) Field of Classification Search ............. 428/423.1, 428/524.6; 156/242, 272.6
See application file for complete search history.

(56) References Cited

U.S. PATENT DOCUMENTS

| 5,529,655 A | 6/1996 | Bravet et al. |
| 2002/0197487 A1 | 12/2002 | Bier et al. |
| 2003/0138573 A1 | 7/2003 | Mikhael et al. |
| 2004/0171767 A1 | 9/2004 | Pohlmann et al. |

FOREIGN PATENT DOCUMENTS

| EP | 1335641 A1 | 8/2003 |
| WO | WO-01/54209 A2 | 7/2001 |
| WO | WO-03/014179 A1 | 2/2003 |
| WO | WO-03/048067 A1 | 6/2003 |

*Primary Examiner*—Thao T. Tran
(74) *Attorney, Agent, or Firm*—Connolly Bove Lodge & Hutz LLP

(57) ABSTRACT

Item comprising glass, wherein at least one portion of the surface of the glass has been adhesive-bonded to a thermoplastic polyurethane without any chemical adhesion promoter.

14 Claims, 1 Drawing Sheet

COMPOSITE ELEMENT, ESPECIALLY A WINDOW PANE

RELATED APPLICATIONS

Figure 1:
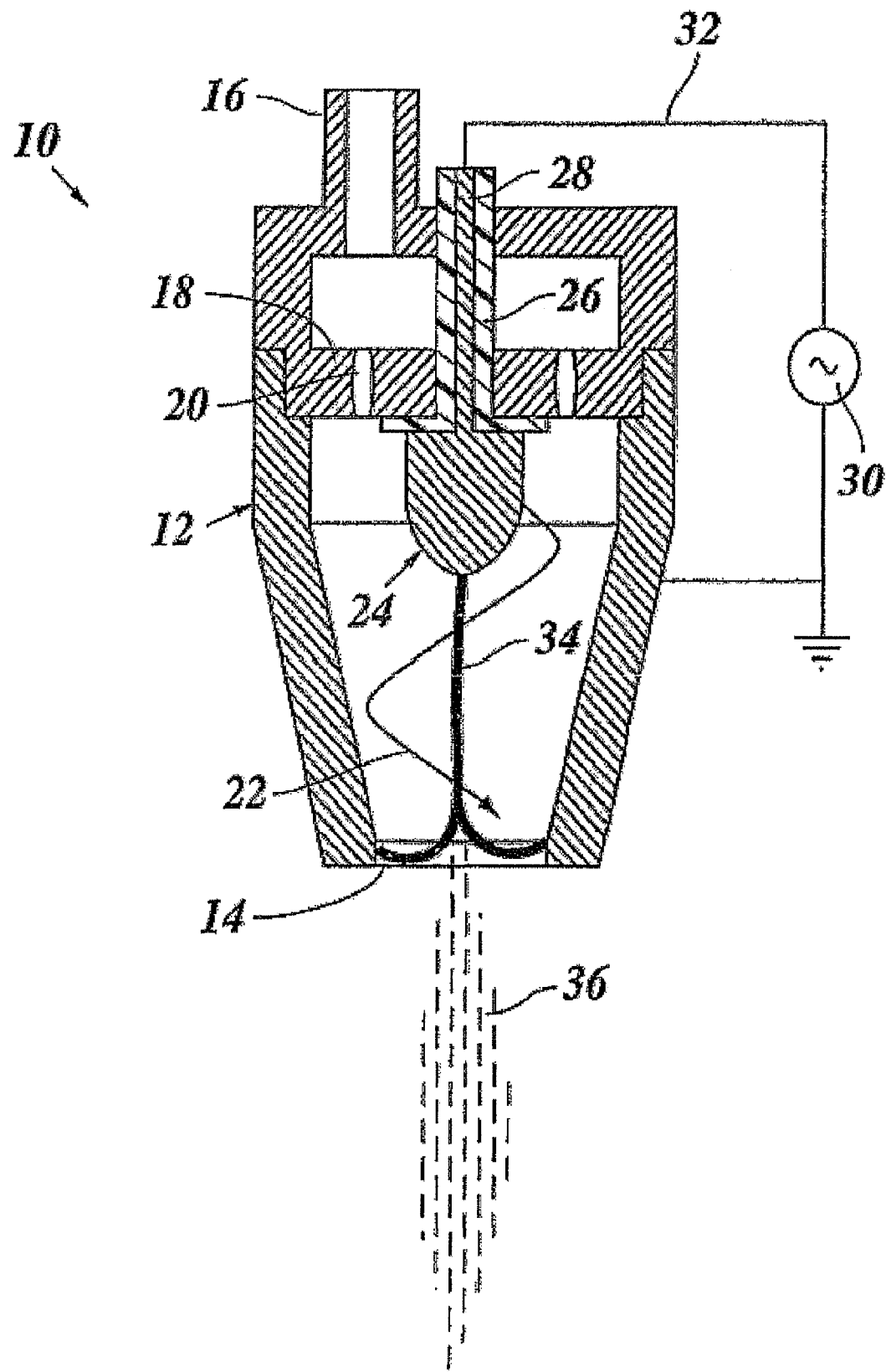

This application is a national stage application (under 35 U.S.C. §371) of PCT/EP2006/061886, filed Apr. 27, 2006, which claims benefit of German application 10 2005 020 510.0, filed Apr. 29, 2005.

The invention relates to items comprising glass which is preferably transparent, i.e. at least to some extent permeable with respect to visible light, and which is preferably inorganic, where at least one portion of the surface of the glass has been adhesive-bonded to thermoplastic polyurethane, without any chemical adhesion promoter. The invention further relates to processes for production of an item comprising, preferably inorganic, glass and comprising thermoplastic polyurethane adhesive-bonded thereto, without any chemical adhesion promoter, wherein at least a section of the surface of the glass is plasma-treated, and wherein the thermoplastic polyurethane is then brought into contact with the plasma-treated surface of the glass, preferably brought into contact in the molten state with the plasma-treated surface, preferably molded on by means of injection molding.

Items based on glass are well-known and have been widely described. In many applications, e.g. window panes, automobile direction-indicator casings, or other transparent covers, it is desirable to ensure that there is an adhesive bond between, for example, sealing material and the glass.

It was therefore an object of the present invention to develop an adherent material combination, preferably a window pane, e.g. for automobiles, aircraft, or buildings, in particular an automobile tailgate pane or automobile side pane, or a cover of a light source, preferably headlamps and/or automobile direction-indicator casings, particularly preferably automobile headlamp casings and/or automobile direction-indicator casings, based on glass and having sufficient, preferably very good, adhesion between the glass and another component in contact with the glass.

These objects were achieved via the items described at the outset.

"Without any chemical adhesion promoter" means according to the invention that there is no other component (adhesion promoter), i.e. no component other than the glass or the thermoplastic polyurethane, in particular no adhesive, present between the glass and the thermoplastic polyurethane, also termed TPU in this specification.

A feature of the inventive items is that direct adhesion is present between the glass and the thermoplastic polyurethane. This type of bond has hitherto not been accessible and has correspondingly not been disclosed. For the first time, this permits direct bonds which allow use in the applications described at the outset, with a wide range of possible variations, and also in particular a wide range of structural possibilities and design possibilities. Specifically via its direct adhesive bond, i.e. without use of chemical adhesion promoters or solvents, in particular adhesives, the direct combination of materials opens up new and hitherto unknown possibilities for increasing the quality of products in many applications.

These items are thus preferably window panes, for example for furniture, automobiles, aircrafts, or buildings, in particular automobile front panes, automobile tailgate panes, or automobile side panes, particularly preferably automobile tailgate panes or automobile side panes, or covers of light sources, preferably headlamp casings and/or automobile direction-indicator casings, particularly preferably automobile headlamp casings and/or automobile direction-indicator casings. The glass is preferably a sheet-like molding. The thermoplastic polyurethane preferably covers only one portion of the surface of the glass. The arrangement preferably has the thermoplastic polyurethane at the edge of the glass. The thermoplastic polyurethane is preferably the gasket of the window pane, in particular of the abovementioned window panes, or of the cover for light sources, in particular of the abovementioned casings.

The inventive combination of materials has the advantage of high-quality feel, and it is also possible to provide a surface that has sophisticated optical properties, because TPU has very good performance in replicating the surfaces of molds. Another feature of TPU is very little surface soiling, and its color can be varied widely by using color concentrates. The thermoplastic polyurethane here can preferably comprise UV stabilizers. Preference is moreover given to thermoplastic polyurethane based on aliphatic isocyanates. The Shore A hardness of the thermoplastic polyurethane is preferably smaller than 95, but the thermoplastic polyurethane here preferably comprises no plasticizers. Particular preference is given to thermoplastic polyurethane whose Shore hardness of the thermoplastic polyurethane is from 45 A to 80 A, its tensile strength to DIN 53504 is greater than 15 MPa, its tear propagation resistance to DIN 53515 is greater than 30 N/mm, and its abrasion to DIN 53516 is smaller than 250 mm$^3$.

The peel resistance in relation to the adhesion of the thermoplastic polyurethane to the glass to DIN EN 1464 is preferably at least 1 N/mm, particularly preferably at least 2 N/mm.

Other embodiments of the glass and of the thermoplastic polyurethane appear in this specification below.

Another object consisted in developing a process of maximum efficiency and effectiveness which can produce the items described at the outset, and in particular which permits a high degree of freedom of variation and in particular also freedom of structure and design freedom for window panes, for example for furniture, automobiles, aircrafts, or buildings, in particular automobile front panes, automobile tailgate panes, or automobile side panes, particularly preferably automobile tailgate panes or automobile side panes, or covers for light sources, preferably headlamp casings and/or automobile direction-indicator casings, particularly preferably automobile headlamp casings and/or automobile direction-indicator casings.

These objects have been achieved via the process described at the outset. The inventive process for the first time permits, via use of the plasma treatment of the surface of the glass, direct adhesive-bonding between the glass and the TPU. New possibilities in design and structure of the preferred items result specifically via this direct application of the TPU to the glass.

The TPU used may comprise well-known grades of TPU. The TPUs are preferably applied to the glass by means of injection molding. The TPU is therefore preferably applied to the plasma-treated surface of the glass by means of injection molding. The thermoplastic polyurethane is particularly preferably applied by means of injection molding to the plasma-treated surface, preferably the edger, of the glass.

The TPU used in the inventive process described at the outset preferably comprises thermoplastic polyurethane whose Shore A hardness is smaller than 95, but the thermoplastic polyurethane preferably comprises no plasticizers. The TPU used preferably comprises thermoplastic polyurethane whose Shore hardness is from 45 A to 80 A, its tensile strength to DIN 53504 is greater than 15 MPa, its tear propagation resistance to DIN 53515 is greater than 30 N/mm, and its abrasion to DIN 53516 is smaller than 250 mm$^3$.

Plasma treatment here is any form of plasma treatment. This includes atmospheric plasma treatment processes and low-pressure plasma treatment processes. In the case of the atmospheric plasma treatment processes, a distinction is made according to the manner of generating a plasma jet by means of a high-frequency arc discharge, a corona discharge, or high-frequency excitation. Atmospheric plasma treatment here means that the treatment of the surface takes place in atmospheric ambient conditions, meaning that no specific precautions have to be taken for low ambient pressure.

Preference is given here to atmospheric plasma treatment by means of a high-frequency arc discharge. This is described in the specifications EP 0 761 415, EP 0 986 939, EP 1 067 829, EP 1 236 380, and EP 1 335 641. Apparatuses for plasma treatment are obtainable from Plasmatreat GmbH, Bisamweg 10, 33803 Steinhagen, for example.

A plasma is preferably generated in a plasma source by means of high-voltage discharge. This plasma is passed through a plasma nozzle and brought into contact with the surface of the glass, the plasma source being moved within a distance of from 2 mm to 25 mm relative to the surface of the glass at a velocity of from 0.1 m/min to 400 m/min, preferably from 0.1 m/min to 200 m/min, particularly preferably from 0.2 m/min to 50 m/min, the surface thus being plasma-treated. The plasma treatment preferably lasts from 1 ms to 100 s. The gas flow rate can be up to 20 m$^3$/h per nozzle. Stationary or rotating plasma nozzles may be used. The surface temperature of the component can be from 5° C. to 250° C., preferably from 5° C. to 200° C.

In the single FIGURE attached, the structure and the mode of functioning of a preferred example of a plasma nozzle is shown.

The plasma nozzle 10 shown in the FIGURE has a nozzle tube 12 with, arranged at the front end, a nozzle aperture 14. The nozzle aperture 14 is composed, at least on the inner side, of an electrically conducting material, in particular of a metal. The nozzle tube 12 is likewise preferably composed of metal, but it is also possible to use non-electrically-conducting metals. At the end opposite to the nozzle aperture 14, the nozzle tube 12 has a gas inlet 16 for an operating gas, for example for compressed air.

Other operating gases which may be used as gases or gas mixtures other than air or forming gas. It is preferable here that there is a proportion present of a gas which is reactive when in the excited state. By way of example, therefore, a pure oxygen gas may be used, or a mixture composed of a noble gas, such as argon, and of oxygen, or a mixture composed of hydrogen and nitrogen (forming gas). However air is preferred, not least for reasons of process technology, because this operating gas is very readily available and often requires no additional equipment.

For the mode of operation of the apparatus 10, it has proven very advantageous for the operating gas to flow in the form of a vortex through the nozzle tube. However, the present invention is not restricted to generation of this vortex during operation of the apparatus.

In the inventive example shown in the FIGURE, in the apparatus 10, there is a partition 18 preferably composed of an electrically conducting material and separating the gas inlet 16 from the inner space of the nozzle tube 12. For controlled inlet of the operating gas, the partition 18 has a ring of holes 20 obliquely set in the direction of the circumference, and thus forms a device for rotating the operating gas. The form in which the operating gas passes through that portion of the nozzle tube 12 situated downstream is therefore that of a vortex 22 whose core is concurrent with the longitudinal axis of the nozzle tube 12.

An inner electrode 24 has been arranged centrally on the underside of the partition 18 and protrudes coaxially into the nozzle tube 12. In the present inventive example, the inner electrode 24 is formed by a rotationally symmetrical pin, rounded at the tip and composed, by way of example, of copper, electrically insulated by an insulator 26 from the partition 18 and from the other parts of the nozzle tube 12. Other embodiments of the inner electrode 24 with dimensions different from the form shown are likewise possible, as indeed also are asymmetrically arranged inner electrodes.

The inner electrode 24 has preferably been electrically insulated from the nozzle apertures 14 functioning as counter-electrode. The partition 18 and/or the nozzle tube 12 can therefore also be composed of an electrically insulating material.

The inner electrode 24 has been connected by way of an insulated shaft 28 to a high-frequency transformer 30, which can generate a high-frequency alternating potential. This high-frequency alternating potential is preferably variably controllable and—measured point-to-point, $U_{ss}$—is by way of example 500 V or more, preferably from 1 to 5 kV, and also in particular greater than 5 kV.

By way of example, the order of the magnitude of the frequency is from 50 Hz to 100 kHz, preferably from 1 to 30 kHz, preferably likewise being controllable. The shaft 28 has been connected to the high-frequency transformer 30 by way of a preferably flexible high-voltage cable 32.

The reason for such wide ranges for the values stated for the magnitude and the frequency of the alternating potential is that these values depend considerably on the selected geometry of the apparatus 10. The shape of the potential curve is moreover not significant. The alternating potential can therefore be a sinusoidal potential or else a pulsed potential.

The high-frequency potential applied triggers the discharge in the form of an arc 34 between the inner electrode 24 and the nozzle aperture 14, and the plasma here is stabilized by the high frequency of the potential, while the currents are small. The high frequency of the potential leads to a frequency-cycle interruption of the discharge which therefore is constantly re-triggered at the same frequency. Another way of describing the process, for example in the case of a sinusoidal alternating potential, is continuous triggering within each half wave.

If, in addition, there is rotary flow of the operating gas within the nozzle tube 12, the arc 34 becomes channeled in the vortex core on the axis of the nozzle tube 12 as a result of the slightly reduced pressure and the insulating action of the gas flow. The result is that the arc 34 does not branch until the region of the nozzle aperture 14 has been reached, where it impacts its electrically conducting inner wall.

The inlet 16 has been connected by way of a hose not shown to a compressed air source with variable throughput, this source preferably having been combined with the high-frequency generator 30 to give a supply unit. The plasma nozzle 10 can therefore be readily moved by hand or with the aid of a robot arm. The nozzle tube 12 and the partition 18 have preferably been earthed, if they themselves are composed of an electrically conducting material.

The operating gas, which rotates in the region of the vortex core and therefore in the immediate vicinity of the arc discharge 34, comes into intimate contact with the arc and is at least partially converted thereby into the plasma state. The result is that a plasma jet 36 shown in the FIGURE by broken lines and composed of an atmospheric plasma emerges from the nozzle aperture 14. The shape of this plasma jet 36 is approximately that of a candle flame.

When comparison is made with thermal plasmas, the ion temperature of the plasma jet is low. By way of example, a temperature below 300° C. was measured in the plasma jet, using a PT100 thermometer at a distance of 10 mm from the nozzle aperture. This measured value is merely illustrative and does not restrict the invention.

The plasma jet emerging from the nozzle aperture 14 is accelerated prior to emergence mainly by the pinch effect occurring in the discharge. The gas pressure and the nozzle effect on emergence of the plasma jet from the nozzle aperture can also contribute to acceleration. Overall, a high emergence velocity is achieved and in turn brings about a large number of interactions with the surface to be processed, and at the same time enlarges the reach of the plasma jet. The reason is that impact losses within the plasma jet are smaller for high emergence velocities.

As described above, the TPU is preferably applied to the glass by means of injection molding. The injection molding of thermoplastics is well known and has also in particular been described widely for thermoplastic polyurethane.

The temperature during the injection molding of thermoplastic polyurethane here is preferably from 140 to 250° C., particularly preferably from 160 to 230° C. TPUs are preferably processed under very mild conditions. The temperatures can be matched to the hardness. The periphery velocity during plastification is preferably smaller than or equal to 0.2 m/s, and the back pressure is preferably from 30 to 200 bar. The injection rate is preferably very low, in order to maintain low shear stress. The cooling times selected is preferably to be sufficiently long, the hold pressure preferably being from 30 to 80% of the injection pressure. The molds are preferably temperature-controlled to from 30 to 70° C.

The glass used may comprise well known, preferably inorganic types of glass, which can usually comprise silicon dioxide and, if appropriate calcium oxide, sodium oxide, boron trioxide, aluminum oxide, lead oxide, magnesium oxide, barium oxide, and/or potassium oxide. Examples of materials that may be used are plate glass, container glass, industrial glass, incandescent-lamp glass, TV-tube glass, laboratory-equipment glass, lead-crystal glass, and fiber glass. Corresponding types of glass and moldings comprising these types of glass are widely marketed.

Thermoplastic polyurethanes, also termed TPUs in this specification, and processes for their preparation are well known. TPUs are generally prepared via reaction of (a) isocyanates with (b) compounds reactive toward isocyanates, usually with a molecular weight ($M_w$) of from 500 to 10 000, preferably from 500 to 5 000, particularly preferably from 800 to 3 000, and (c) with chain extenders with a molecular weight of from 50 to 499, if appropriate in the presence of (d) catalysts and/or of (e) conventional additives.

The starting components and processes for production of the preferred polyurethanes will be described by way of example below. The components (a), (b), (c), and also, if appropriate, (d) and/or (e) usually used in production of the polyurethanes will be described by way of example below:

a) Organic isocyanates (a) which may be used are well-known aliphatic, cycloaliphatic, araliphatic, and/or aromatic isocyanates, for example tri-, tetra-, penta-, hexa-, hepta-, and/or octamethylene diisocyanate, 2-methylpenta-methylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and/or phenylene diisocyanate. 4,4'-MDI is preferably used. For powder slush applications, as described at the outset, preference is also given to aliphatic isocyanates, particular preference being given to 1-isocyanato-3,3,5-trimethyl-5-isocyanatomethylcyclohexane (isophorone diisocyanate, IPDI) and/or hexamethylene diisocyanate (HDI), in particular hexamethylene diisocyanate. As previously described at the outset, the isocyanate (a) used may also comprise prepolymers which have free isocyanate groups. The NCO content of these prepolymers is preferably from 10 to 25%. An advantage which the prepolymers can provide, due to the preliminary reaction that takes place during their preparation, is lower reaction time for production of the TPUs.

b) Compounds (b) which may be used, these being reactive toward isocyanates, are the well-known compounds reactive toward isocyanates, for example polyesterols, polyetherols, and/or polycarbonatediols, these usually also being combined under the term "polyols", having molar masses of from 500 to 8000, preferably from 600 to 6000, in particular from 800 to less than 3000, and preferably having an average functionality toward isocyanates of from 1.8 to 2.3, preferably from 1.9 to 2.2, in particular 2. It is preferable to use polyether polyols, such as those based on well-known starter substances and on conventional alkylene oxides, e.g. ethylene oxide, propylene oxide, and/or butylene oxide, preference being given to polyetherols based on propylene 1,2-oxide and ethylene oxide, and in particular polyoxytetramethylene glycols. The polyetherols have the advantage of having greater hydrolysis resistance than polyesterols.

The polyetherols used may also comprise what are known as low-unsaturation polyetherols. For the purposes of this invention, low-unsaturation polyols are in particular polyether alcohols whose content of unsaturated compounds is less than 0.02 meg/g, preferably less than 0.01 meg/g.

These polyether alcohols are mostly prepared by addition reaction of alkylene oxides, in particular ethylene oxide, propylene oxide and mixtures of these onto the triols or diols described above in the presence of high-activity catalysts. Examples of these high-activity catalysts are cesium hydroxide and multimetal cyanide catalysts, also termed DMC catalysts. A DMC catalyst often used is zinc hexacyanocobaltate. The DMC catalyst may be left in the polyether alcohol after the reaction, but is usually removed, for example by sedimentation or filtration.

Polybutadienediols whose molar mass is from 500 to 10 000 g/mol, preferably from 1000 to 5000 g/mol, in particular from 2000 to 3000 g/mol, may also be used. TPUs produced using these polyols can be radiation-crosslinked after thermoplastic processing. This gives better combustion performance, for example.

Instead of one polyol, it is also possible to use a mixture of various polyols.

c) Chain extenders (c) that may be used comprise well-known aliphatic, araliphatic, aromatic and/or cycloaliphatic compounds having a molar mass of from 50 to 499, preferably difunctional compounds, such as diamines and/or alkanediols having from 2 to 10 carbon atoms in the alkylene radical, in particular 1,3-propanediol, 1,4-butanediol, 1,6-hexanediol, and/or di-, tri-, tetra-, penta-, hexa-, hepta-, octa-, nona- and/or decaalkylene glycols having from 3 to 8 carbon atoms, and preferably corresponding oligo- and/or polypropylene glycols, and use may also be made of a mixture of the chain extenders.

Components a) to c) are particularly preferably difunctional compounds, i.e. diisocyanates (a), difunctional polyols, preferably polyetherols (b), and difunctional chain extenders, preferably diols.

d) Suitable catalysts which in particular accelerate the reaction between the NCO groups of the diisocyanates (a) and the hydroxy groups of the structural components (b) and (c) are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

e) Alongside catalysts (d), conventional auxiliaries and/or additives (e) may also be added to the structural components (a) to (c). By way of example, mention may be made of blowing agents, surface-active substances, fillers, nucleating agents, lubricants and mold-release agents, dyes and pigments, antioxidants, e.g. those active in relation to hydrolysis, light, heat, or discoloration, inorganic and/or organic fillers, flame retardants, reinforcing agents, plasticizers, and metal deactivators. In one preferred embodiment, hydrolysis stabilizers such as polymeric and low-molar mass carbodiimides are among component (e). The thermoplastic polyurethane particularly preferably comprises melamine cyanurate, which acts as flame retardant, in the inventive materials. The amount of melamine cyanurate used is preferably from 0.1 to 60% by weight, particularly preferably from 5 to 40% by weight, in particular from 15 to 25% by weight, based in each case on the total weight of the TPU. The thermoplastic polyurethane preferably comprises an amount of from 0.1 to 5% by weight, based on the total weight of the thermoplastic polyurethane, of antioxidants, and triazole, and/or triazole derivative. Suitable antioxidants are generally substances which inhibit or prevent undesired oxidative processes in the plastic to be protected. Antioxidants are generally commercially available. Examples of antioxidants are sterically hindered phenols, aromatic amines, thiosynergists, organophosphorus compounds of trivalent phosphorus, and hindered amine light stabilizers. Examples of sterically hindered phenols are found in Plastics Additive Handbook, 5th edition, H. Zweifel, ed., Hanser Publishers, Munich, 2001 ([1]), pp. 98-107 and pp. 116-121. Examples of aromatic amines are found in [1] pp. 107-108. Examples of thiosynergists are given in [1], pp. 104-105 and pp. 112-113. Examples of phosphites are found in [1], pp. 109-112. Examples of hindered amine light stabilizers are given in [1], pp. 123-136. Phenolic antioxidants are preferably suitable for use in the inventive antioxidant mixture. In one preferred embodiment, the antioxidants, in particular the phenolic antioxidants, have a molar mass greater than 350 g/mol, particularly preferably greater than 700 g/mol, and a maximum molar mass<10 000 g/mol, preferably <3000 g/mol. They also preferably have a melting point below 180° C. It is also preferable to use antioxidants which are amorphous or liquid.

Besides the components a), b), and c) mentioned, and, if appropriate d) and e), it is also possible to use chain regulators, usually with molecular weight of from 31 to 3000. These chain regulators are compounds which have only one functional group reactive toward isocyanates, examples being monohydric alcohols, monobasic amines, and/or monohydric polyols. These chain regulators can give precise control of flow behavior, in particular in the case of TPUs. The amount of chain regulators which may generally be used is from 0 to 5 parts by weight, preferably from 0.1 to 1 part by weight, based on 100 parts by weight of component b), and the chain regulators are defined as part of component (c).

To adjust the hardness of the TPUs, the molar ratios of the structural components (b) and (c) may be varied relatively widely. Successful molar ratios of component (b) to the entire amount of chain extenders to be used (c) are from 10:1 to 1:10, in particular from 1:1 to 1:4, and the hardness of the TPUs here rises as content of (c) increases.

The thermoplastic polyurethane used preferably comprises flexible plasticizer-free thermoplastic polyurethane whose hardness is preferably up to 90 Shore A, in particular for applications in the sectors where feel and appearance are important. In applications where wear is a factor, and in impact-protection applications, any of the TPUs up to 80 Shore D can be used. Ether TPUs are to be preferred in applications susceptible to hydrolysis Aliphatic TPUs are to be preferred in applications particularly exposed to light. The number-average molar mass of the thermoplastic polyurethane is preferably at least 40 000 g/mol, particularly preferably at least 80 000 g/mol, in particular at least 120 000 g/mol.

TPUs according to WO 03/014179 are preferred because they have particularly good adhesion. The comments below relating to the examples are based on these particularly preferred TPUs. The reason for the particularly good adhesion of these TPUs is that the processing temperatures are higher than with other "traditional" TPUs with comparable hardnesses and the best bond strength can be achieved in these conditons. These particularly preferred TPUs are preferably obtainable via reaction of (a) isocyanates with (b1) polyester diols whose melting point is greater than 150° C., (b2) polyether diols and/or polyester diols in each case having a melting point smaller than 150° C. and a molar mass of from 501 to 8 000 g/mol, and also, if appropriate, with (c) diols whose molar mass is from 62 g/mol to 500 g/mol. Particular preference is given here to thermoplastic polyurethanes whose molar ratio of the diols (c) of molar mass from 62 g/mol to 500 g/mol to component (b2) is smaller than 0.2, particularly preferably from 0.1 to 0.01. Particular preference is given to thermoplastic polyurethanes whose polyester diols (b1), preferably of molar mass from 1000 g/mol to 5000 g/mol, have the following structural unit (I):

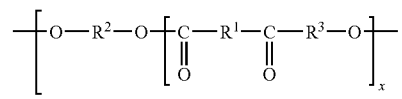

where the definitions of R1, R2, R3 and X are as follows:

R1: carbon skeleton having from 2 to 15 carbon atoms, preferably an alkylene group having from 2 to 15 carbon atoms and/or a bivalent aromatic radical having from 6 to 15 carbon atoms, particularly preferably having from 6 to 12 carbon atoms, R2: if appropriate branched-chain alkylene group having from 2 to 8 carbon atoms, preferably from 2 to 6, particularly preferably from 2 to 4 carbon atoms, in particular —CH$_2$—CH$_2$—, and/or —CH$_2$—CH$_2$—CH$_2$—CH$_2$—, R3: if appropriate branched-chain alkylene group having from 2 to 8 carbon atoms, preferably from 2 to 6, particularly preferably from 2 to 4 carbon atoms, in particular —CH$_2$—CH$_2$— and/or —CH$_2$—CH$_2$—CH$_2$—CH$_2$—, X: a whole number from the range 5 to 30. In this preferred embodiment, the preferred melting point described at the outset and/or the preferred molecular weight are based on the structural unit (I) described.

In this specification, the expression "melting point" means the maximum of the melting point measured using commercially available DSC equipment (e.g. Perkin-Elmer DSC 7).

The molar masses stated in this specification are the number-average molar masses in [g/mol].

These particularly preferred thermoplastic polyurethanes can preferably be prepared by, in a first step (i), reacting a preferably high-molecular-weight, preferably semicrystalline, thermoplastic polyester with a diol (c), and then, in a further reaction (ii), reacting the reaction product from (i), comprising (b1) polyester diol whose melting point is greater than 150° C. and, if appropriate (c) diol together with (b2) polyether diols and/or polyester diols in each case with a melting point smaller than 150° C. and with a molar mass of from 501 to 8000 g/mol, and also, if appropriate, with further (c) diols whose molar mass is from 62 to 500 g/mol, with (a) isocyanates, if appropriate in the presence of (d) catalyst and/or (e) auxiliaries.

The molar ratio of the diols (c) whose molar mass is from 62 g/mol to 500 g/mol to component (b2) during the reaction (ii) is preferably smaller than 0.2, more preferably from 0.1 to 0.01.

While step (i) provides the hard phases for the final product via the polyester used in step (i), the use of component (b2) in step (ii) constructs the soft phases. The preferred technical teaching is that polyesters having a pronounced hard-phase structure which crystallizes well are preferably melted in a reactive extruder and are first degraded using a low-molecular-weight diol to give shorter polyesters having free hydroxy end groups. The original high crystallization tendency of the polyester is retained during this process and can then be utilized on rapid reaction to obtain TPUs with the advantageous properties, such as high tensile strength values, low abrasion values, and, because of the high and narrow melting range, high heat resistances and low compression sets. The preferred process therefore preferably degrades high-molecular-weight, semicrystalline, thermoplastic polyesters using low-molecular-weight diols (c) under suitable conditions in a short reaction time to give rapidly crystallizing polyester diols (b1) which then in turn are incorporated, using other polyester diols and/or poly-ether diols, and diisocyanates, into high-molecular-weight polymer chains.

Prior to the reaction (i) with the diol (c), the molar mass of the thermoplastic polyester used is preferably from 15 000 g/mol to 40 000 g/mol, its melting point preferably being greater than 160° C., particularly preferably from 170° C. to 260° C.

The starting material, i.e. the polyester reacted in step (i), preferably in the molten state, particularly preferably at a temperature of from 230° C. to 280° C., preferably for a period of from 0.1 min to 4 min, particularly preferably from 0.3 min to 1 min, with the diol(s) (c) may comprise well-known, preferably high-molecular-weight, preferably semicrystalline, thermoplastic polyesters, for example in palletized form. By way of example, suitable polyesters are based on aliphatic, cycloaliphatic, araliphatic, and/or aromatic dicarboxylic acids, such as lactic acid and/or terephthalic acid, and on aliphatic, cycloaliphatic, araliphatic, and/or aromatic dialcohols, such as 1,2-ethandiol, 1,4-butandiol, and/or 1,6-hexandiol.

The polyester used particularly preferably comprises: poly-L-lactic acid and/or polyalkylene terephthalate, such as polyethylene terephthalate, polypropylene terephthalate, polybutylene terephthalate, in particular polybutylene terephthalate.

The preparation of these esters from the starting materials mentioned is well-known to the person skilled in the art and has been widely described. Suitable polyesters are moreover available commercially.

The thermoplastic polyester is preferably melted at a temperature of from 180° C. to 270° C. The reaction (i) with the diol (c) is preferably carried out at a temperature of from 230° C. to 280° C., preferably from 240° C. to 280° C.

The dial (c) used in step (i) for reaction with the thermoplastic polyester and, if appropriate, in step (ii) can comprise well-known diols whose molar mass is from 62 to 500 g/mol, for example those mentioned below, e.g. ethylene glycol, 1,3-propandiol, 1,4-butandiol, 1,5-pentandiol, 1,6-hexandiol, heptandiol, octandiol, preferably 1,4-butandiol and/or 1,2-ethandiol.

The ratio by weight of thermoplastic polyester to the diol (c) in step (i) is usually from 100:1.0 to 100:10, preferably from 100:1.5 to 100:8.0.

The reaction of the thermoplastic polyester with the dial (c) in reaction step (i) is preferably carried out in the presence of conventional catalysts, such as those described below. It is preferable that catalysts based on metals are used for this reaction. The reaction in step (i) is preferably carried out in the presence of from 0.1 to 2% by weight of catalysts, based on the weight of the diol (c). Reaction in the presence of catalysts of this type is advantageous in order to permit conduct of the reaction in the reactor, such as a reactive extruder, within the short residence time available.

Examples of catalysts which can be used for this reaction step (i) are: tetrabutyl orthotitanate and/or stannous dioctoate, preferably stannous dioctoate.

The polyester diol (b1) which is a reaction product from (i) preferably has a molar mass of from 1000 g/mol to 5000 g/mol. The melting point of the polyester diol which is a reaction product of (i) is preferably from 150° C. to 260° C., in particular from 165 to 245° C. This means that the reaction product of the thermoplastic polyester with the diol (c) in step (i) comprises compounds with the melting point mentioned, these being used in the subsequent step (ii).

By virtue of the reaction of the thermoplastic polyester with the diol (c) in step (i), the polymer chain of the polyester is cleaved via the diol (c), via transestification. The reaction product of the TPU therefore has free hydroxy end groups, and is preferably further processed in the further step (ii) to give the actual product, the TPU.

The reaction of the reaction product of step (i) in step (ii) preferably takes place via addition of a) isocyanate (a), and also (b2) polyether diols and/or polyester diols, in each case with a melting point smaller than 150° C. and with a molar mass of from 501 to 8000 g/mol, and also, if appropriate, of other diols (c) whose molar mass is from 62 to 500, of (d) catalysts, and/or of (e) auxiliaries to the reaction product from (i). The reaction of the reaction product with the isocyanate takes place by way of the hydroxy end groups produced in step (i). The reaction in step (ii) preferably takes place at a temperature of from 190 to 250° C., preferably for a period of from 0.5 to 5 min, particularly preferably from 0.5 to 2 min, preferably in a reactive extruder, particularly preferably in the reactive extruder in which step (i) was also carried out. By way of example, the reaction of step (i) can take place in the first barrel sections of a conventional reactive extruder and the corresponding reaction step (ii) can be carried out at a subsequent point, i.e. in downstream barrel sections, after addition of components (a) and (b2). By way of example, the first 30-50% of the length of the reactive extruder can be used for step (i), and the remaining 50-70% can be used for step (ii).

An excess of the isocyanate groups over the groups reactive toward isocyanates is preferably present during the reaction in step (ii). The ratio of the isocyanate groups to the hydroxy groups in the reaction (ii) is preferably from 1:1 to 1.2:1, particularly preferably from 1.02:1 to 1.2:1.

The reactions (i) and (ii) are preferably carried out in well-known reactive extruders. These reactive extruders are described by way of example in the company publications from Werner & Pfleiderer or in DE-A 2 302 564.

The method of carrying out the preferred process is preferably such that at least one thermoplastic polyester, e.g. polybutylene terephthalate, is metered into the first barrel section of a reactive extruder and is melted at temperatures which are preferably from 180° C. to 270° C., preferably from 240° C. to 270° C., and, in a subsequent barrel section, a diol (c), e.g. butandiol, and preferably a transestification catalyst, is added, and the polyester is degraded at temperatures of from 240° C. to 280° C. by the diol (c) to give polyester oligomers having hydroxy end groups and having molar masses of from 1000 to 5000 g/mol, and, in a subsequent barrel section, isocyanate (a) and (b2) compounds reactive toward isocyanates and having a molar mass of from 501 to 8000 g/mol and also, if appropriate (c) diols whose molar mass is from 62 to 500, (d) catalysts, and/or (e) auxiliaries are metered in, and then, at temperatures of from 190 to 250° C., the preferred thermoplastic polyurethanes are constructed.

In step (ii), it is preferable that no (c) diols whose molar mass is from 62 to 500 are introduced, except for the diols (c) present in the reaction product of (i) and having a molar mass of from 62 to 500.

In the region in which the thermoplastic polyester is melted, the reactive extruder preferably has neutral and/or reverse-conveying kneading blocks and reverse-conveying elements, and in the region where the thermoplastic polyester is reacted with the diol it preferably has mixing elements on the screw, and toothed disks, and/or toothed mixing elements in combination with reverse-conveying elements.

Downstream of the reactive extruder, the clear melt is usually introduced by means of a gear pump to an underwater pelletizer, and palletized.

The particularly preferred thermoplastic polyurethanes exhibit optically clear, single-phase melts, which solidify rapidly and, as a consequence of the semicrystalline polyester hard phase, form slightly opaque to white opaque moldings. The rapid solidification behavior is a decisive advantage over known mixing specifications and preparation processes for thermoplastic polyurethanes. The rapid solidification behavior is so pronounced that it is even possible to process products with hardnesses of from 50 to 60 Shore A by injection molding with cycle times smaller than 35 s. In extrusion, too, e.g. in production of blown films, no problems typical of TPU arise, e.g. adhesion or blocking of the foils or bubbles.

The proportion of the thermoplastic polyester in the final product, i.e. in the thermoplastic polyurethane, is preferably from 5 to 75% by weight. The preferred thermoplastic polyurethanes are particularly preferably products of the reaction mixture comprising from 10 to 70% by weight of the reaction product from (i), from 10 to 80% by weight of (b2), and from 10 to 20% by weight of (a), these weight data being based on the total weight of the mixture comprising (a), (b2), (d), (e), and the reaction products from (i).

The hardness of the preferred thermoplastic polyurethanes is preferably from Shore 45 A to Shore 78 D, particularly preferably from 50 A to 75 D.

The preferred thermoplastic polyurethanes preferably have the following structural unit (II):

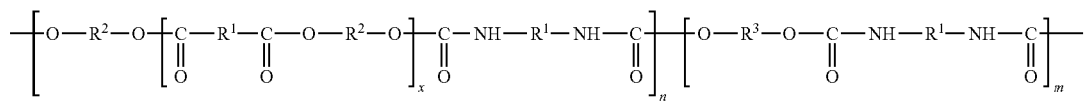

with the following definitions for R1, R2, R3 and X:

R1: carbon skeleton having from 2 to 15 carbon atoms, preferably an alkylene group having from 2 to 15 carbon atoms and/or a aromatic radical having from 6 to 15 carbon atoms, R2: if appropriate branched-chain alkylene group having from 2 to 8 carbon atoms, preferably from 2 to 6, particularly preferably from 2 to 4 carbon atoms, in particular —$CH_2$—$CH_2$—, and/or —$CH_2$—$CH_2$—$CH_2$—$CH_2$—, R3: a radical resulting from the use of polyether diols and/or polyester diols in each case having molar masses of from 501 g/mol to 8000 g/mol as (b2) or from the use of alkandiols having from 2 to 12 carbon atoms for the reaction with diisocyanates, X: a whole number from the range 5 to 30, n and m: a whole number from the range from 5 to 20.

The radical R1 is defined via the isocyanate used, and the radical R2 is defined via the reaction product of the thermoplastic polyester with the diol (c) in (i), and the radical R3 is defined via the starting components (b2) and, if appropriate (c) during the preparation of the TPUs.

The invention claimed is:

1. A process for producing an item comprising glass wherein at least one portion of the surface of said glass has been adhesive-bonded without chemical adhesion promoter to thermoplastic polyurethane, wherein said thermoplastic polyurethane has a Shore hardness of from 45 A to 80 A, a tensile strength to DIN 53504 of greater than 15 MPa, a tear propagation resistance to DIN 53515 of greater than 30 N/mm, and an abrasion to DIN 53516 of less than 250 mm$^3$, comprising plasma-treating at least one section of the surface of said glass followed by bringing the thermoplastic polyurethane into contact with said at least one plasma-treated section of the surface of said glass and wherein said thermoplastic polyurethane is in a molten state when it is brought into contact with the plasma treated surface of the glass.

2. The process of claim 1, wherein said thermoplastic polyurethane is applied by means of injection molding to said at least one plasma-treated section of the surface of said glass.

3. The process of claim 2, wherein said at least one plasma-treated section of the surface of said glass is the edge of said glass.

4. The process of claim 1, wherein said at least one section of the surface of said glass is plasma-treated with an atmospheric plasma.

5. The process of claim 4, wherein said atmospheric plasma is generated in a plasma source by means of a high-frequency high voltage discharge, and wherein said atmospheric plasma is brought into contact with said at least one section of the surface of said glass by means of a plasma nozzle.

6. The process of claim 5, wherein said plasma source is moved within a distance of from 2 mm to 25 mm with a velocity of from 0.1 m/min to 400 m/min relative to the surface of the glass.

7. The process of claim 1, wherein said plasma treatment is carried out for a time period of from 1 ms to 100 s.

8. The process of claim 1, wherein said thermoplastic polyurethane has a Shore A hardness of less than 95.

9. The item produced by the process of claim 1.

10. The item of claim 9, wherein said item is a window pane.

11. The item of claim 10, wherein said window pane is an automobile, aircraft, or building window pane.

12. The item of claim 9, wherein said item is an automobile tailgate pane, an automobile side pane, or a cover for a light source.

13. The item of claim 9, wherein said item is a headlamp or an automobile direction-indicator casing.

14. The item of claim 13, wherein said headlamp is an automobile headlamp casing.

\* \* \* \* \*